S. SIEGEL.
METHOD AND MEANS FOR CONNECTING PIPE COUPLINGS.
APPLICATION FILED JULY 23, 1918. RENEWED JUNE 21, 1920.
1,349,586.
Patented Aug. 17, 1920.
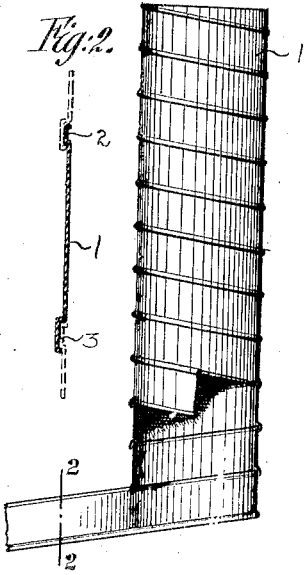
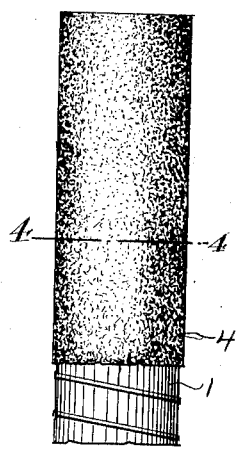
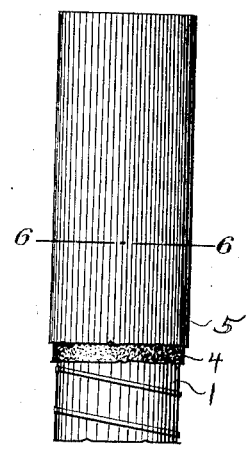
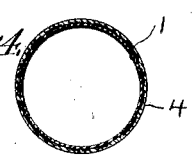
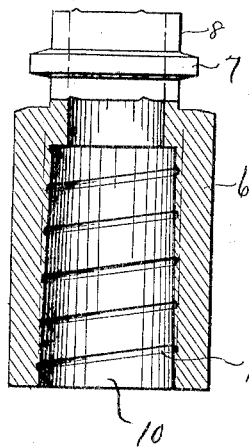
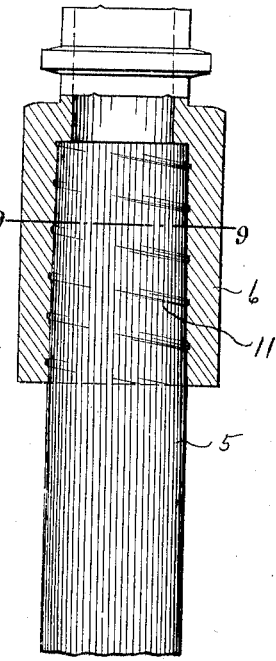
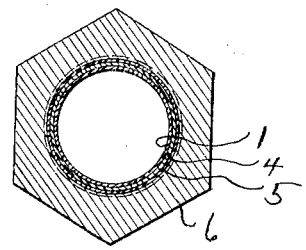
INVENTOR
Samuel Siegel
BY Mock + Blum
ATTORNEYS.

UNITED STATES PATENT OFFICE.

SAMUEL SIEGEL, OF BROOKLYN, NEW YORK, ASSIGNOR TO ATLANTIC METAL HOSE COMPANY, INC., OF NEW YORK, N. Y., A CORPORATION OF NEW YORK.

METHOD AND MEANS FOR CONNECTING PIPE-COUPLINGS.

1,349,586.     Specification of Letters Patent.     Patented Aug. 17, 1920.

Application filed July 23, 1918, Serial No. 246,383. Renewed June 21, 1920. Serial No. 390,670.

*To all whom it may concern:*

Be it known that I, SAMUEL SIEGEL, a citizen of the United States, residing at 716 De Kalb avenue, Brooklyn, city of New York, in the county of Kings and State of New York, have invented certain new and useful Improvements in Method and Means for Connecting Pipe-Couplings, of which the following is a specification.

My invention relates to a method and means for connecting a pipe coupling to a pipe and the like.

In particular my invention is directed toward securing couplings and fittings upon pipes of the type that are used for conducting gasolene and other fluids under high pressure. To withstand this high pressure, it has been customary heretofore to construct such pipes of a helical strip of steel or some other metal, which was surrounded by a jacket of rubber, and then by a jacket of some strong fabric such as canvas or the like.

Great difficulty has been experienced in connecting metal fittings such as nozzles, or couplings to these pipes, as the high pressures made it impossible to secure them in position. Various clenching or clamping means have been proposed, but these were expensive and not reliable.

According to my invention a very simple, cheap, and efficient method and means are provided for connecting metal fittings and couplings to pipes of all descriptions, and particularly to pipes composed of a resilient metal strip wound into helical form.

Other objects of my invention will be mentioned in the following description and drawings which illustrate a preferred embodiment thereof:—

Figure 1 is a perspective view of the helical metal strip.

Fig. 2 is a cross-section on line 2—2 of Fig. 1.

Fig. 3 is the same as Fig. 1, with the rubber jacket also shown.

Fig. 4 is a section on line 4—4 of Fig. 3.

Fig. 5 is the same as Fig. 3 showing the canvas jacket.

Fig. 6 is a section on line 6—6 of Fig. 5.

Fig. 7 is a cross section of the nut which connects the coupling or fitting to the pipe.

Fig. 8 is an elevation, partly in section, showing the coupling fitted to the pipe.

Fig. 9 is a cross section on line 9—9 of Fig. 8.

The metal foundation of the pipe is made of a strip of steel 1, having offset portions 2 and 3 as shown in Fig. 2, so that when the strip is wound into a helix as shown in Fig. 1, the offset portions or shoulders 2 and 3 on adjacent windings interlock.

Figs. 1 and 2 are only intended to show this in diagrammatic form as various methods are known for forming a flexible metal pipe from a helical strip of metal, and my invention is not limited to any particular form. In the particular embodiment herein described, strip 1 is wound left-handed, but of course it could also be wound in the other direction.

This helical strip is covered with rubber jacket 4, and a strong jacket of canvas or other strong material is then woven tightly around the rubber jacket 4, which tightly fits over the helical strip. By this means, if the pipe is used for carrying gasolene or the like, the rubber is protected from the gasolene, and it can withstand the high pressures because of the cloth jacket 5.

A metal coupling or fitting 8 of any kind whatever, and which is not specifically illustrated in the drawings, because my invention is not directed to any particular coupling, is made integral with or otherwise connected to a nut 6 having a mouth 10. The coupling 8 is preferably provided with a shoulder 7, if it is desired to form a union in the well known manner.

The mouth 10 of the nut 6 has a diameter which is a little smaller than the combined diameter of the parts 1, 4 and 5, which combined diameter may be called the exterior diameter of the pipe.

The nut 6 is threaded in the same direction as the helical strip, and the thread is a little smaller in diameter at the mouth 10 than the pipe, and its diameter gradually becomes smaller as it recedes from the mouth 10. The operation of this device is as follows:—

The pipe is firmly held at a short distance from one end so that it cannot turn because the jackets 4 and 5 are so firmly held against each other that by grasping the jacket 5 firmly with the hand, any relative rotation of the parts 1 and 4 is easily prevented.

Then the nut 6 is screwed on the pipe. In the particular embodiment shown, the pitch of the thread 9 is the same as that of the helical strip 1, but it need not be the same, and it usually is much smaller. However experience has shown that if the nut 6 is forced on to the pipe with a turning motion, that it is screwed on the pipe, so to say, as the threading 9 is forced into the jacket 5, along the lines 11, as illustrated in Fig. 8.

Since the thread 9 and the winding of the strip are in the same direction, both being left-handed the turning of the nut 6 in the ordinary manner to the right causes the helix to be slightly compressed, say about one-thirty-second of an inch in a helix about one-fourth of an inch in diameter, and to also become slightly elongated.

This effect is also aided by the fact that the thread 9 has an interior conical contour, and becomes smaller as it recedes from the mouth 10.

When the nut has been fully screwed on as shown in Fig. 8, and is then released, the helix which has been slightly compressed and elongated by the screwing on of the nut 6, springs back into normal shape, and the resilient jackets 4 and 5 are so firmly pressed in between the windings of the threading 9, and grip the nut 6 so firmly, that it can no longer be turned, and it cannot be dislodged by a force of hundreds of pounds.

It is not necessary that the pipe should have its threadings underneath the jackets formed by a helical strip, as good results could also be secured by merely placing a resilient jacket over the threadings at the end of an ordinary rigid pipe, and then screwing on a nut in the manner before mentioned, without permitting the jacket 4 or the windings of the pipe to rotate when the nut is screwed on.

I have described a preferred embodiment of my invention, but it is clear that numerous changes and omissions could be made without departing from its spirit.

What I claim is:—

1. A method of connecting a member having a resilient outer winding and an exterior resilient jacket firmly secured thereto to a member having an inner winding of a different pitch which consists in forcing the member having the inner winding over the said jacket with a revolving motion relative to said outer winding and jacket, to compress and elongate said outer winding, and cause it to firmly press the jacket against said inner winding when the revolving motion ceases.

2. In combination, a member having an exterior winding, a resilient jacket firmly connected thereto over said winding, and a seceond member having an interior winding of the same direction as said exterior winding and of a different pitch, the said interior winding having a diameter less than the exterior diameter of said jacket.

3. In combination, a member having a bendable and yieldable winding, a resilient jacket firmly connected thereto over said winding, and a second member having an interior diameter of the same direction as said exterior winding and of a different pitch, the said interior winding having a mouth adapted to receive said first-mentioned member and said jacket, and being of gradually decreasing diameter as it recedes from said mouth, so that when connected, the said jacket is compressed thereby.

4. In combination a resilient helical strip having its adjacent windings interlocked, a rubber jacket tightly gripping said strip, a canvas jacket tightly gripping said rubber jacket, whereby said jackets cannot be turned relatively to said strip, and a member having a mouth and an interior thread of the same direction as the helix formed by said strip, the said mouth being adapted to receive the said strip and jackets, and the said thread being of gradually smaller diameter as it recedes from said mouth, so that when said member is screwed on said jackets in the direction of its thread, said helical strip is compressed and elongated.

In testimony whereof I hereunto affix my signature.

SAMUEL SIEGEL.